United States Patent [19]

Laughlin

[11] Patent Number: 5,448,011
[45] Date of Patent: Sep. 5, 1995

[54] LOW VOLTAGE MOUNTING PLATE AND METHOD OF INSTALLATION

[75] Inventor: R. Scott Laughlin, Cuyahoga Falls, Ohio

[73] Assignee: Erico International Corporation, Solon, Ohio

[21] Appl. No.: 44,977

[22] Filed: Apr. 8, 1993

[51] Int. Cl.⁶ .............................................. H02G 3/22
[52] U.S. Cl. ....................................................... 174/48
[58] Field of Search ........................... 174/48; 220/3.9; 248/56

[56] References Cited

U.S. PATENT DOCUMENTS

| | | | |
|---|---|---|---|
| 3,941,915 | 3/1976 | Boghosian | 174/48 |
| 4,955,825 | 9/1990 | Groth et al. | 439/535 |
| 4,964,525 | 10/1990 | Coffey et al. | 220/3.9 |

OTHER PUBLICATIONS

Caddy Fasteners for the Communications & Low Voltage Industries 5 Catalog pages—Author Erico Products, Inc. date: 1990.

*Primary Examiner*—Leo P. Picard
*Assistant Examiner*—David Tone
*Attorney, Agent, or Firm*—Renner, Otto, Boisselle & Sklar

[57] ABSTRACT

A low voltage outlet mounting plate for interior wall construction includes an apparatus to affix the plate to the face and/or side of a stud at a selected height. The plate also includes a generally rectangular wall projecting outwardly from the face of the stud the approximate thickness of the drywall or finish installation, the outwardly projecting wall surrounding a rectangular opening. A pair of bendable tabs projects from the top and bottom edges of the opening and each is adapted to be bent horizontally inwardly to a direction perpendicular to the face of the stud. A hole is provided in the each tab adapted to receive wiring conduit or a tied loose wire. In this manner, when the wall is finished the wiring or conduit is convenient to the rectangular opening for final installation of the outlet. The disclosure also includes the method of installing the outlet which includes the steps of affixing the plate to the stud, bending the tabs and securing wiring or conduit to the tabs, all before the finish installation of the wall. After the wall is finished, the wire or conduit is convenient to the opening and the installation is completed.

14 Claims, 2 Drawing Sheets

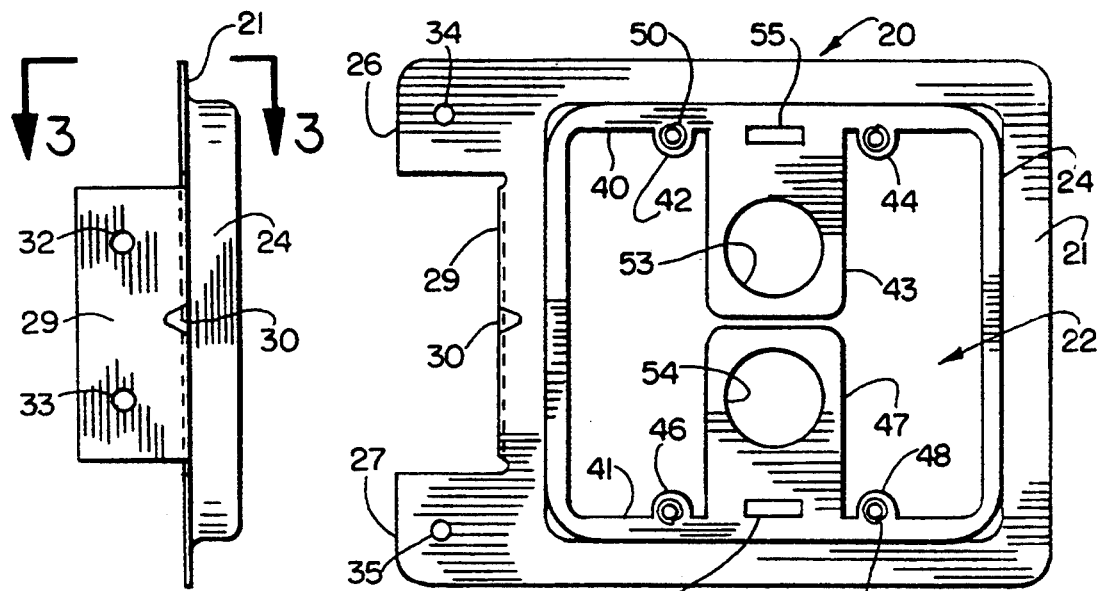
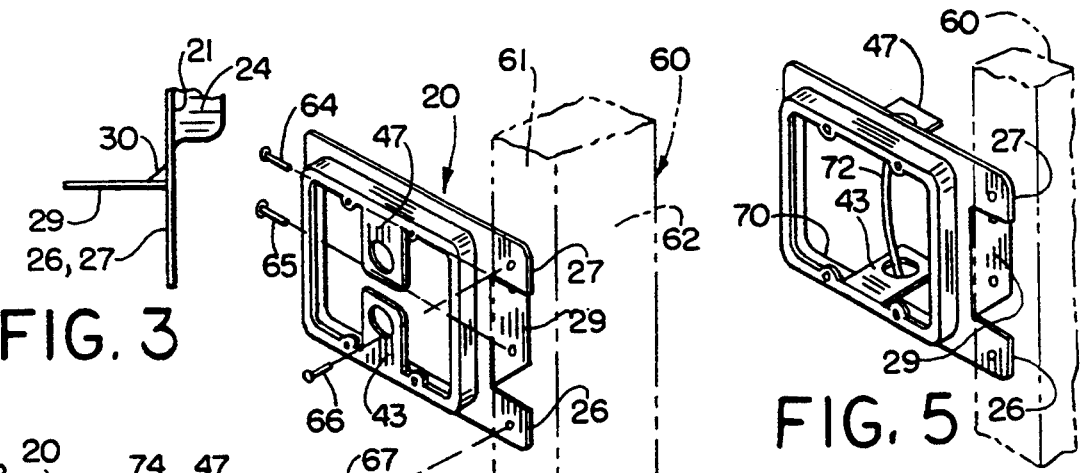
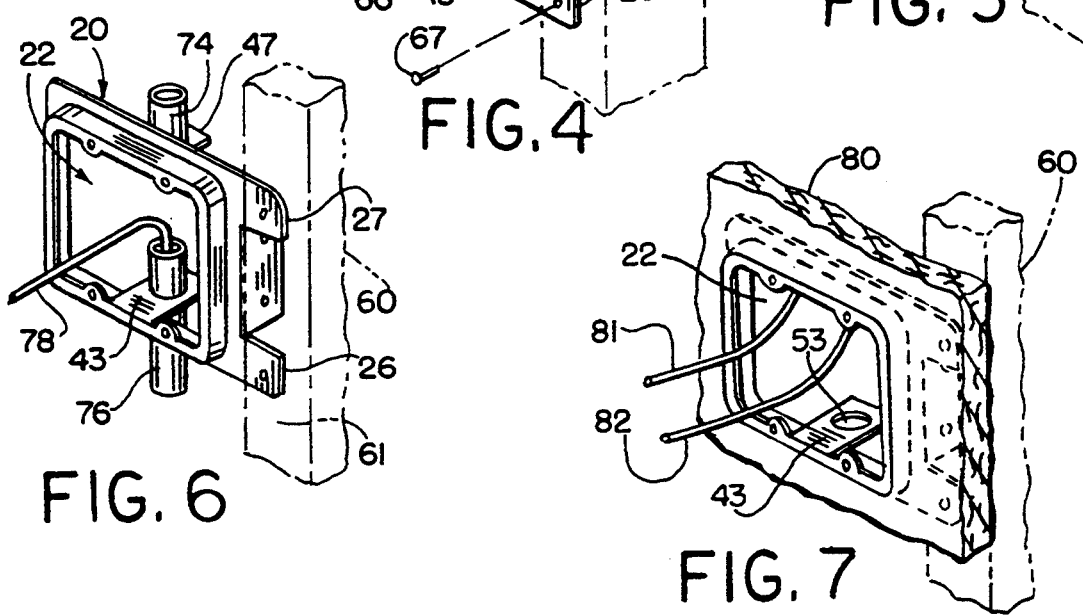

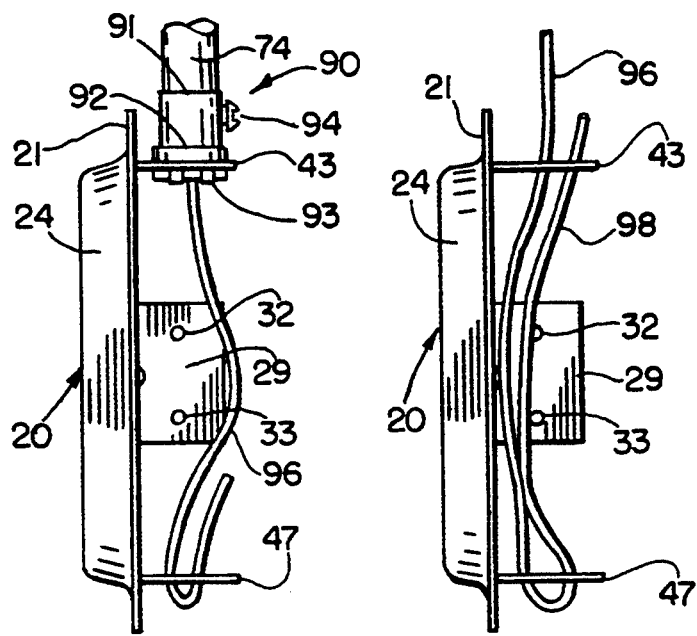
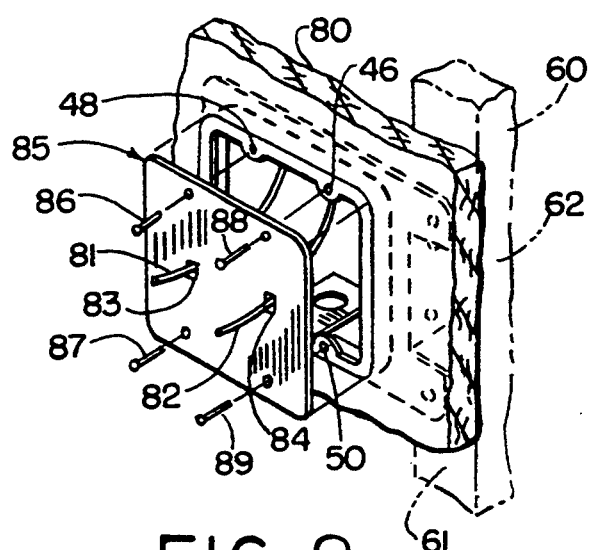

LOW VOLTAGE MOUNTING PLATE AND METHOD OF INSTALLATION

DISCLOSURE

This invention relates generally as indicated to a low voltage mounting plate and to a method of installation where the plate may conveniently and accurately be affixed to a stud, and a wiring conduit or wiring affixed to the plate, all before the wall is enclosed by drywall or finish material such as plaster.

BACKGROUND OF THE INVENTION

Low voltage outlets are increasingly common in interior wall construction or reconstructions. Low voltage outlets now permeate all construction environments with the increasing use of telephones, televisions or monitors, computers, security devices, and other similar electronics and communication equipment. Low voltage outlets typically would include TV cable outlets, radio and TV antennas, some security systems, phone jacks, computer lines, and sound systems.

These outlets do not require a junction box so that all that is needed is a plate on which to mount a cover plate. Low voltage mounting plates have been widely employed. These plates have an opening with bendable tabs which are bent to wrap around the edge of an opening in a wall panel such as dry wall. The plate may be fastened to the drywall or in some cases not held other than by the bendable tab. When the wires are pulled through, the wires are telescoped into one or more holes in a cover plate, and the cover plate is fastened to the mounting plate.

Examples of prior low voltage mounting plates may be seen in Prior Groth et al U.S. Pat. No. 4,955,825. Other examples would be the well known MP1 or MP2 mounting brackets sold by ERICO Inc. of Solon, Ohio, under the trademark CADDY ®.

Once the wall panel or drywall is in place, getting such low voltage wiring through the wall is difficult. In new interior wall construction or reconstruction, it is customary to install wiring or conduit for the wiring after the studding is in place, but before the wall panels, plastering, or drywall is secured to the face of the studs, thus enclosing the wall. For new work there has been developed an MP1S plate mounting plate which may be secured to a stud. The rectangular opening on such plate has no bendable tabs.

Typically, conduit has to be supported on the stud near the mounting plate location and requires a fastener or groinmet for proper installation or mounting on the stud. In any event, considerable planning is required so that the conduit is accessible through the opening for a mounting plate. A simple error can lead to expensive reconstruction. In applications that don't use conduit, the wire generally dangles freely inside the mounting plate or hole and may well get shifted or go back up between the studs during drywall or other finish material installation. In such event, what should be a simple task is not.

Accordingly, it would be desirable to have a low voltage mounting plate which could be secured directly to a wood or metal stud, before drywall or other finish material installation, and to which conduit or wiring may be secured, all to ensure convenient accessibility to the opening for ease of final installation. In this manner, the mounting plate would be more firmly and accurately fixed to the wall with the installation problems noted above avoided.

SUMMARY OF THE INVENTION

A low voltage outlet mounting plate for interior wall construction includes means to affix the plate to the face and/or side of a stud at a selected height. The plate also includes a generally rectangular wall projecting outwardly from the face of the stud the approximate thickness of the drywall or finish installation, the outwardly projecting wall surrounding an opening. At least one bendable tab projects from an edge of the opening and is adapted to be bent horizontally inwardly to a direction perpendicular to the face of the stud. A hole is provided in the tabs adapted to receive wiring conduit or a tied loose wire. In this manner, when the wall is finished the wiring or conduit is convenient to the opening for final installation of the outlet. The invention also includes the method of installing the outlet which includes the steps of affixing the plate to the stud, bending the tab and securing wiring or conduit to the tab, all before the finish installation of the wall. After the wall is finished, the wire or conduit is convenient to the opening and the installation is completed.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a front elevation of the mounting plate prior to installation;

FIG. 2 is a side edge view as seen from the left-hand side of FIG. 1;

FIG. 3 is a fragmentary top edge view as seen from the line 3—3 of FIG. 2;

FIG. 4 is a perspective view of the mounting plate being affixed to the face and/or side of the stud;

FIG. 5 is a similar view showing the wire supporting tabs after being bent to extend perpendicular to the face of the stud and with wires wrapped around one or both tabs;

FIG. 6 is a similar view which illustrates the tabs used to secure wiring conduit to the interior of the mounting plate;

FIG. 7 is a similar view of wires being pulled through after the drywall is installed;

FIG. 8 is a similar view illustrating the installation of the cover plate;

FIG. 9 is a somewhat enlarged edge elevation of the termination of a conduit at the mounting plate; and, FIG. 10 is a view similar to FIG. 9 of a simple tie-off at the mounting plate for low voltage wiring.

DETAILED DESCRIPTION OF THE PREFERRED EMBODIMENTS

Referring initially to FIGS. 1-3, it will be seen that the low voltage mounting plate of the present invention is shown generally at 20 and comprises a rectangular plate 21 which has a major rectangular opening 22. The plate surrounds the opening but is recessed rearwardly from the opening by a forwardly projecting wall 24 which acts as a plaster ring. In this manner the opening projects forwardly from the peripheral portion of the plate a distance approximately equal to the thickness of plaster board or drywall. The planar extent of the plate 21 around the forwardly projecting wall 24 is essentially uniform except on the left hand edge as seen in FIG. 1. This edge projects further to left as seen in FIG. 1 forming top and bottom tabs 26 and 27, respectively which are in the plane of the plate. Between these tabs there is struck a rearwardly extending center flange 29 which has a dimple gusset 30 formed at the center of the bend. The center flange is provided with two holes seen at 32 and 33. The tab 26 is provided with a single hole 34 while the tab 27 is provided with a hole 35. As will hereinafter be described, the holes enable the mounting plate to be secured to a wood or metal stud at a selected height with fasteners entering either the face or side of the stud, or both.

The major opening 22 is rectangular and includes parallel top and bottom edges 40 and 41. Formed along the top edge are a semi-circular projection 42, a center tab 43, and another semi-circular projection 44. Arranged along the bottom edge are semi-circular projection 46, center tab 47, and semi-circular projection 48. Each semi-circular projection includes a partial thread form as seen at 50. In this manner, the cover plate shown in FIG. 8 can quickly be attached to the mounting plate covering the opening 22.

Each tab is provided with a relatively large circular hole as seen at 53 and 54, respectively. Also, each tab includes a rectangular smaller hole, as seen at 55 and 56, respectively which has the inner edge thereof aligned with the top or bottom edge of the major planar opening 22. These smaller rectangular openings enable the tabs to be field bent inwardly to a horizontal position as will be described. It will also be noted that the mounting plate does not have a differing top and bottom. The mounting plate can be turned over so that the center flange 29 is on right. In this manner, the mounting plate can be supported to extend to either side of the face of a stud.

The mounting plate can quickly be made by stamping on a progressive die. The material is typically a galvanized cold rolled steel (CRS) of 24 gauge. No special treatment is required of the finished part.

It is noted that the material and thickness of the part as well as the configuration of the holes 55 and 56 is designed so that the tabs can be bent to a horizontal position, but when bent to such position, will provide sufficient support for holding firmly a conduit termination or tied wire. The tabs when horizontally bent, are significantly rigid and are not designed to be bent beyond a horizontal position.

Referring now to FIG. 4, there is illustrated a typical stud 60 which has a face 61 and a side 62. It is the opposite faces to which the paneling, drywall or plaster finish is secured. The mounting plate 20 may be easily attached to the stud at the selected desired height using drywall or self tapping screws as indicated at 64, 65, 66 and 67. It will be appreciated that the screws may be employed only into the face of the stud or only into the side of the stud, or both. It is also noted that the plate is reversed from the orientation seen in FIG. 1 and could as easily be mounted on the opposite side of the stud simply by swinging it over 180°. It will also be appreciated that the mounting plate may as easily be attached to metal studs using such drywall or self tapping screws. In any event, when the plate is attached, it is firmly held in position.

After the plate is attached to the stud, as seen in FIG. 5, the metal tabs 43 and 47 are bent inwardly horizontally. It is again noted that the tabs are not designed to be bent beyond the horizontal position shown and the inner edge of the wall 24 as seen at 70 in FIG. 5. When bent to the horizontal position illustrated, the tabs form rigid flanges to which conduit may be secured and when secured, form a significantly rigid construction. Once the tabs 47 and 43 are bent horizontally, they may be employed to secure a loose wire such as seen at 72. The wire is sufficiently stiff that it may be simply threaded through the hole in one tab and looped about the hole and an edge of the other tab. Alternatively, the wire may be secured more firmly such as by an actual knot.

As seen in FIG. 6, conduit seen at 74 and 76 may be secured to one or both tabs. The wire indicated at 78 may be fished through one or both conduits either before or after the roughed in wall is completed.

As seen in FIG. 7, the drywall shown at 80 has been installed and the wires 81 and 82, which are convenient to the opening 22, are simply pulled through.

As seen in FIG. 8, the final installation step is the threading of the wires 81 and 82 through openings 83 and 84, respectively in cover plate 85, which is then secured to the mounting plate by the fasteners 86, 87, 88 and 89. The fasteners extend through the thread impressions 50 in the holes in the semi-circular projections 42, 44, 46, and 48. In this manner, the wires are conveniently accessed to the opening to be threaded through the cover plate which then is quickly installed on the mounting plate.

As seen in FIG. 9, the conduit 74 may be mounted to the tab 43 by the use of a conventional conduit fitting shown generally at 90. The conduit may be secured to the tab 43 in the same manner that conduit would be secured to a knock-out hole in an electrical box. The fitting includes a sleeve 91 which has a shoulder 92 which fits on one side of the hole 53 and also includes a short threaded section which fits through the hole and on which is threaded nut 93. In this manner the fitting is firmly secured to the tab around the hole and the conduit 74 telescopes into the sleeve 91 and is held firmly in place by a set screw 94. The wiring 95 fished through the conduit 74 may temporarily be looped around the tab 47 and either be folded into the hole 54 or looped around an edge of the tab and through the hole.

For loose wire as seen in FIG. 10, the wiring 96 may simply extend through both holes in both tabs and be bent back as shown at 98, again to extend through both holes. This avoids the loose wire dangling through the opening of the plate during the finish of the rough wall and provides a secure anchor for the wiring during the finishing process.

The illustrated embodiment permits the mounting of two low voltage class two devices two-a-time. The convenient horizontal tabs serve as termination points for conduit or permits the installer to tie off wire ends prior to final connection and prior to the finishing of the roughed in wall.

The mounting plate of the present invention attaches quickly and easily to the front of, and/or side of, wood or metal studs using dry wall or self-tapping screws. No electrical box is required. The raised lip or wall 24 automatically positions the planar opening 22 for either ½" or ⅝" drywall, other paneling or finished plastering, and produces no unsightly bulges which sometimes result from separate plaster rings.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. A low voltage mounting plate having a planar opening including first means operative to secure said plate to a stud before application of the wall finish to the stud, and second means bent from the opening to extend away from the plane of the opening operative to secure to said plate either electrical conduit or wiring while the studs are still exposed whereby such wiring or conduit will be conveniently available at the opening of such mounting plate after the wall is finished.

2. A plate as set forth in claim 1 wherein said second means is adapted to receive and anchor electrical conduit.

3. A plate as set forth in claim 2 wherein said first means includes a right angle flange adapted to extend parallel to the side of the stud in a vertical plane perpendicular to the face of the stud.

4. A plate as set forth in claim 1 wherein said plate includes an outwardly projecting wall portion extending outwardly of the face of the stud by the thickness of the wall finish.

5. A plate as set forth in claim 1 wherein said planar opening is generally rectangular, and said second means comprises at least one tab projecting into the opening and bent to a direction generally perpendicular to the plane of the opening, whereby conduit or wiring may be secured thereto.

6. A method of installing a low voltage outlet including a cover plate and a mounting plate having an opening comprising the steps of affixing the plate to a stud, securing wiring or wiring conduit to the interior of the plate before the wall is finished, then finishing the installation by pulling the wiring from the interior through the opening, threading the wiring through the cover plate, and securing the cover plate to the mounting plate.

7. A method as set forth in claim 6 including the step of manually forming wiring or wiring conduit affixing flanges projecting inwardly from the plate opening.

8. A method as set forth in claim 7 wherein said opening has a top and bottom edge, and said flanges are formed by bending tabs to extend inwardly perpendicular to the opening and parallel to each other.

9. A method as set forth in claim 7 wherein said flanges are formed after said plate is affixed to the stud.

10. A low voltage mounting plate having a planar opening including first means operative to secure said plate to a stud before application of the wall finish to the stud, and second means operative to secure to said plate either electrical conduit or wiring while the studs are still exposed whereby such wiring or conduit will be conveniently available at the opening of such mounting plate after the wall is finished, said second means being adapted to receive and anchor electrical conduit, and said first means including a right angle flange adapted to extend parallel to the side of the stud in a vertical plane perpendicular to the face of the stud, said right angle flange being formed from one vertical edge of the plate, and extending perpendicular to two extensions of the plate, each adapted to be secured to the face of the stud with said flange abutting the side of the stud.

11. A low voltage mounting plate having a planar opening including first means operative to secure said plate to a stud before application of the wall finish to the stud, and second means operative to secure to said plate either electrical conduit or wiring while the studs are still exposed whereby such wiring or conduit will be conveniently available at the opening of such mounting plate after the wall is finished, said planar opening being generally rectangular, and said second means comprising at least one tab projecting into the opening and adapted to be bent to a direction perpendicular to the plane of the opening, whereby conduit or wiring may be secured thereto, said tab being bent to extend perpendicular to the face of the stud.

12. A plate as set forth in claim 11 including two tabs, and holes in each tab for conduit or wiring.

13. A plate as set forth in claim 12 wherein said opening includes generally parallel top and bottom edges, and said tabs are bent along each respective edge to extend inwardly horizontally parallel to each other at the top and bottom of the opening.

14. A plate as set forth in claim 13 wherein said plate includes third means to secure a cover plate thereto.

* * * * *